(12) United States Patent
Ono et al.

(10) Patent No.: US 6,645,662 B1
(45) Date of Patent: Nov. 11, 2003

(54) BATTERY PROVIDED WITH AN OLD-OR-NEW IDENTIFICATION SEAL HAVING A HEAT SENSITIVE ADHESIVE LAYER

(75) Inventors: Tadashi Ono, Hirakata (JP); Katsuhiko Kumakura, Soraku-gun (JP); Minoru Kouda, Hirakata (JP); Tomotaka Kawano, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 178 days.

(21) Appl. No.: 09/889,887
(22) PCT Filed: Oct. 13, 2000
(86) PCT No.: PCT/JP00/07148
§ 371 (c)(1),
(2), (4) Date: Jul. 24, 2001
(87) PCT Pub. No.: WO01/39299
PCT Pub. Date: May 31, 2001

(30) Foreign Application Priority Data

Nov. 24, 1999 (JP) .............................. 11-332511

(51) Int. Cl.⁷ .............................. H01M 2/30; H01M 6/06
(52) U.S. Cl. .............................. 429/65; 429/48; 429/130
(58) Field of Search .............................. 429/65, 48, 130

(56) References Cited

U.S. PATENT DOCUMENTS 5,725,966 A * 3/1998 Abe et al. .................. 429/167

FOREIGN PATENT DOCUMENTS

| JP | 45-9926 | 5/1970 |
|----|---------|--------|
| JP | 49-16832 | 4/1974 |
| JP | 50-8179 | 3/1975 |
| JP | 50-19624 | 6/1975 |
| JP | 52-072029 | 5/1977 |
| JP | 53-36024 | 3/1978 |
| JP | 54-048934 | 4/1979 |
| JP | 58-169768 | 10/1983 |
| JP | 62-168564 | 10/1987 |
| JP | 09-231954 | 9/1997 |

* cited by examiner

Primary Examiner—Mark Ruthkosky
(74) Attorney, Agent, or Firm—McDermott, Will & Emery

(57) ABSTRACT

In order to provide a battery comprising an old-or-new identification seal which is applicable to both the positive electrode terminal and the negative electrode terminal and is simple in terms of attaching operation, this specification discloses an old-or-new identification seal made of an insulating base material having a heat sensitive adhesive layer.

5 Claims, 3 Drawing Sheets

BATTERY PROVIDED WITH AN OLD-OR-NEW IDENTIFICATION SEAL HAVING A HEAT SENSITIVE ADHESIVE LAYER

TECHNICAL FIELD

The present invention relates to a battery comprising a seal attached thereon which can be used for identifying the unused state of a battery, that is, whether the battery is new or old.

BACKGROUND ART

Hitherto, various methods have been devised for identifying the unused state, or the so-called virginity, of a battery.

For example, JP 52-72029, U discloses a sealing member for a positive electrode terminal surface comprising an insulating ring made of a thermoplastic synthetic resin with a L-shaped cross section, and a bridging band-like portion formed integrally with this.

However, there is a problem that this sealing member has a complex structure thereby making the integral formation step itself complicated. Additionally, there is another problem that the installation of the sealing member on the positive electrode terminal surface is relatively difficult. Further, this sealing member is not applicable to the negative electrode terminal surface.

Next, JP 54-48934, U discloses an old-or-new classification plate for dry batteries obtained by providing small pores on the periphery of the center of an insulating thin plate such as paper, and applying an adhesive on a portion thereof other than the center. Further, JP 58-169768, A discloses a sealing tape for dry batteries. This tape is obtained by applying an adhesive on one surface of a band-like tape body to cause a band-like film to adhere along the central portion of the resulting adhesive surface, causing the above film to adhere on a base and forming the above film such that the sealing tape located at the central portion of the tape body can be stripped off by providing slits.

However, the adhesives described in these publications are ones having the so-called adhesiveness, and applicable to both the positive electrode terminal surface and the negative electrode terminal surface; however there is a problem that they are inferior in terms of workability in adhesion.

In view of such problem in the past, an object of the present invention is to obtain a battery comprising an old-or-new identification seal attached thereon, which is applicable to both the positive electrode terminal and the negative electrode terminal and is simple in terms of the attaching operation.

DISCLOSURE OF INVENTION

The present invention provides a battery comprising an old-or-new identification seal made of an insulating base material having a heat sensitive adhesive layer, with the seal being attached on at least one of the positive electrode terminal and the negative electrode terminal via the adhesive layer.

It is preferable that the insulating base material is made of a heat-shrinkable resin film.

Also, it is preferable that the seal has an adhesive-free layer on a portion thereof in contact with the positive electrode terminal surface and/or the negative electrode terminal surface.

Also, it is effective that the battery is covered with a heat-shrinkable sheathing material and the old-or-new identification seal is formed integrally with the sheathing material.

Herein, "terminal surface" in the present invention refers to the surface located on the outermost end portion of the terminal of the battery.

BEST MODE FOR CARRYING OUT THE INVENTION

Figure 1:
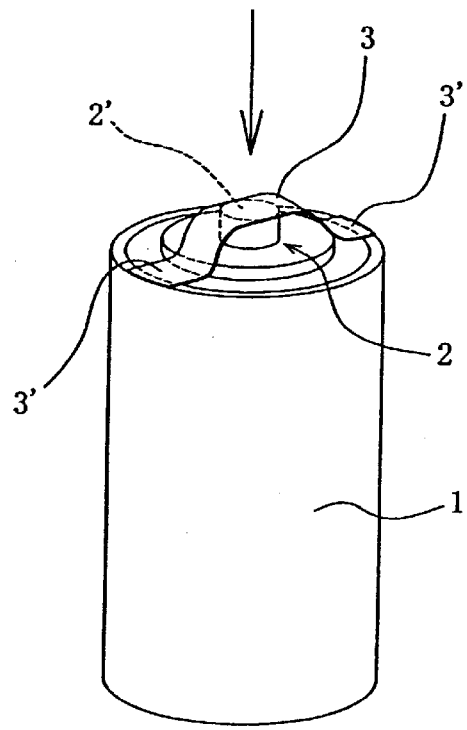
FIG. 1 is a perspective view of a battery comprising an identification seal attached on the positive electrode terminal according to one embodiment of the present invention.

The present invention provides a battery having at least one of a positive electrode terminal and a negative electrode terminal covered with an old-or-new identification seal (hereinafter, referred to as "identification seal") made of a base material having a heat sensitive adhesive layer via the adhesive layer.

Herein, the most remarkable feature of the present invention lies in that a heat sensitive adhesive layer is provided on the identification seal. The presence of such a heat sensitive adhesive layer allows the identification seal to be attached on the positive electrode terminal surface and/or the negative electrode terminal surface by heating only the heat sensitive adhesive layer portion. Further, owing to the heat sensitive adhesive layer, once the identification seal is stripped, it cannot be re-attached unless there is a heat source, resulting in an advantage that the reliability in ensuring the virginity is improved.

The identification seal in the present invention is made of an insulating base material having a heat sensitive adhesive layer.

The insulating base material is not specifically limited insofar as it has insulation and, for example, can be bent to some extent so that it can be attached along the positive electrode terminal and the negative electrode terminal of the battery. For example, paper and various resin films can be listed. Particularly, it is preferable to use a heat-shrinkable film in terms of the reliably that it covers the terminals close-tightly by being heat shrunk in conformity with the shape of the terminals so that the periphery of the identification seal is difficult to be caught to come off.

As the heat-shrinkable resin film, for example, it is possible to use a mono- or multi-layered film (e.g., having a thickness of approximately 0.01 to 0.2 mm) formed from polyester such as polyethylene terephthalate, polyvinyl chloride, polyethylene, polypropylene and polyamide. As the above heat-shrinkable film, it is preferable to use a film formed by being uniaxially or biaxially stretched so as to greatly shrink in a circumferential direction when it is attached on a battery.

Also, as the heat sensitive adhesive which forms the heat sensitive adhesive layer, for example, it is possible to use an adhesive formed by adding tackifiers such as rosin, petroleum resin and terpene resin, a plasticizer. a lubricant and the like to ethylene type resins such as polyethylene, an ethylene-vinyl acetate copolymer, an ethylene-methacrylic acid copolymer, an ethylene-acrylic acid copolymer and an ethylene-methyl methacrylate copolymer.

This heat sensitive adhesive is particularly preferable in the case where a heat-shrinkable film is used as the insulating base material. For example, by suitably selecting a temperature of heat sensitive adhesion of the heat sensitive adhesive and that of heat shrinkage of the heat-shrinkable film, it is possible to change the order of performing the adhesion by the heat sensitive adhesive and the heat-shrinking of the heat-shrinkable film.

In the case where the temperature of heat sensitive adhesion of the heat sensitive adhesive is lower than that of heat shrinkage of the heat-shrinkable film, it is possible, during the attachment, to cause the identification seal to adhere first by gradual heating, followed by heat shrinking. Also, in the case where the temperature of heat sensitive adhesion of the heat sensitive adhesive is higher than that of heat shrinkage of the heat-shrinkable film on the contrary, it is possible, during the application of the identification seal, to heat shrink the identification seal first, followed by adhesion. From the viewpoint of providing the identification seal certainly without marring the appearance, the former is considered preferable.

Next, the forms of the identification seal in accordance with the present invention will be explained by referring to drawings. It should be noted that the forms of the identification seal in the present invention are not limited to these, insofar as at least one of the positive electrode terminal surface and the negative electrode terminal surface can be effectively sealed.

(1) As to the Positive Electrode Terminal

First, an example of the form of the identification seal for the positive electrode terminal will be explained.

FIG. 1 is a perspective view of a battery comprising an identification seal attached on the positive electrode terminal according to one embodiment of the present invention.

As shown in FIG. 1, the battery in accordance with the present invention is configured by attaching an identification seal 3 on a positive electrode terminal 2 of a battery body 1.

Herein, it is preferable that the identification seal 3 has a layer, which is formed by the application of a heat sensitive adhesive, on both end portions 3' in contact with the positive electrode terminal 2. In this manner, when only the end portions 3' has the adhesive layer, it is possible to attach the identification seal 3 on the positive electrode terminal 2 by merely heating the top surface.

Also, if the heat sensitive adhesive layer is not provided, in other words, if an adhesive-free layer is provided, on the portion of the identification seal 3 in contact with a positive electrode terminal surface 2', which is the outermost end portion of the positive electrode terminal 2, there is an advantage that the identification seal 3 can be readily removed.

Figure 2:
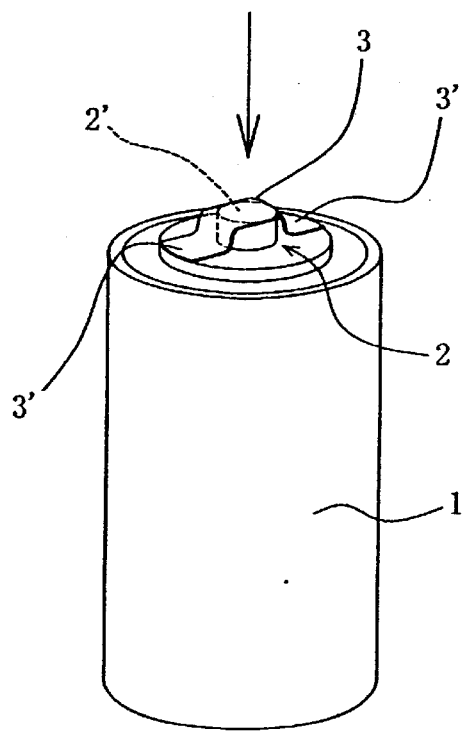
FIG. 2 is a perspective view of a battery comprising an identification seal attached on the positive electrode terminal according to another embodiment of the present invention.

Next, FIG. 2 is a perspective view of a battery comprising an identification seal attached on the positive electrode terminal according to another embodiment of the present invention.

Since the positive electrode terminal can take various shapes according to the type of the battery, it may be in a state in which the identification seal 3 is attached on a portion of the positive electrode terminal as shown in FIG. 2, insofar as at least the positive electrode terminal surface 2' in the positive electrode terminal 2 can be covered. Herein, the parts in FIG. 2 that are indicated with the same numbers with those in FIG. 1 are the same as those previously described.

(2) As to the Negative Electrode Terminal

Figure 3:
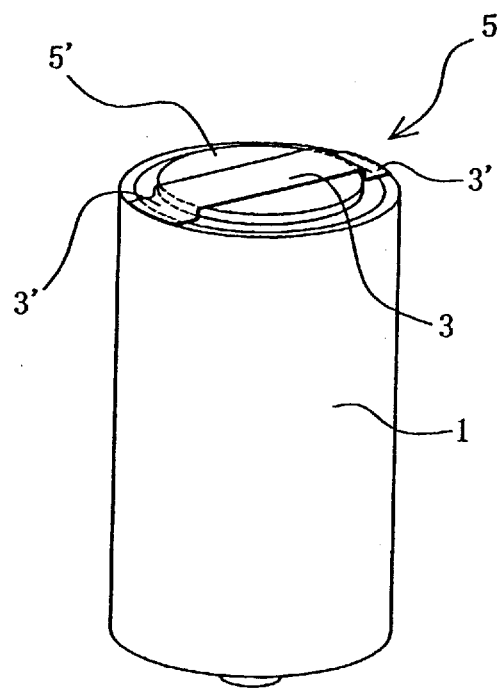
FIG. 3 is a perspective view of a battery comprising an identification seal attached on the negative electrode terminal according to one embodiment of the present invention.
Figure 4:
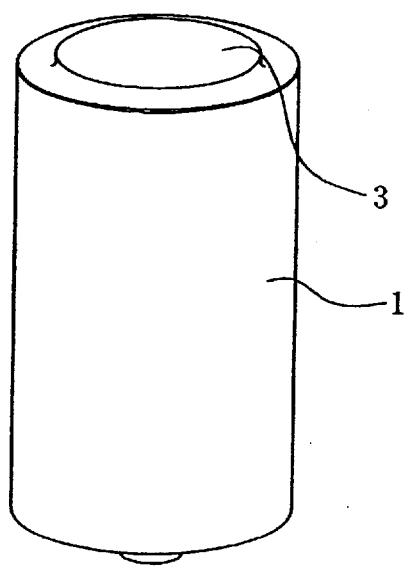
FIG. 4 is a perspective view of a battery comprising an identification seal attached on the negative electrode terminal according to another embodiment of the present invention.

FIG. 3 and FIG. 4 show how to attach the identification seal 3 of the present invention on a negative electrode terminal 5 of the battery body 1. FIG. 3 is a perspective view of a battery comprising an identification seal attached on the negative electrode terminal according to one embodiment of the present invention. Also, FIG. 4 is a perspective view of a battery comprising an identification seal attached on the negative electrode terminal according to another embodiment of the present invention.

As shown in FIG. 4, a circular identification seal 3 capable of covering the entire surface of the negative electrode terminal 5 may be attached. However, in terms of ease of removal, it is preferable to provide the heat sensitive adhesive layer on the peripheral portion other than the negative electrode terminal surface.

Also, the identification seal 3 may be in the shape of a band as shown in FIG. 3, and it is preferable not to provide the heat sensitive adhesive layer on the portion of the negative electrode terminal 5 in contact with the negative electrode terminal surface 5', but to provide it only on both end portions 3' of the identification seal 3.

Herein, although the shapes of the identification seal were exemplified for the positive electrode terminal and the negative electrode terminal, these shapes can be used interchangeably for the positive electrode terminal and the negative electrode terminal in any combinations. Furthermore, the identification seal of the present invention can be suitably modified according to the shape of battery and not limited to these forms.

(3) As to the Integral Formation With a Sheathing Material

Further, it is effective that the identification seal in the present invention is formed integrally with a sheathing material covering the battery.

Figure 5:
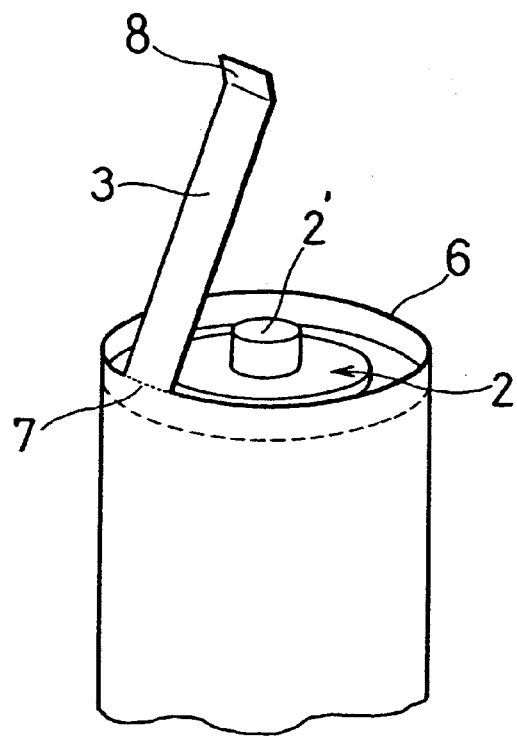
FIG. 5 is a diagram showing how to provide a battery with an identification seal formed integrally with a sheathing material in accordance with the present invention.

FIG. 5 shows a diagram showing how to provide a battery with an identification seal formed integrally with a sheathing material in accordance with the present invention. As shown in FIG. 5, it is preferable that the identification seal 3 is formed integrally with a sheathing material 6 and a perforation 7 is provided on the boundary portion thereof. Also, it is effective that a heat sensitive adhesive layer is provided on the surface of the identification seal 3 facing the positive electrode terminal 2 and a margin without the heat sensitive adhesive applied thereon is provided on the end portion 8 so as to facilitate the removal of the identification seal 3.

Also, it is preferable that the heat sensitive adhesive layer is not provided on the portion of the positive electrode terminal 2 in contact with the positive electrode terminal surface 2'.

Figure 6:
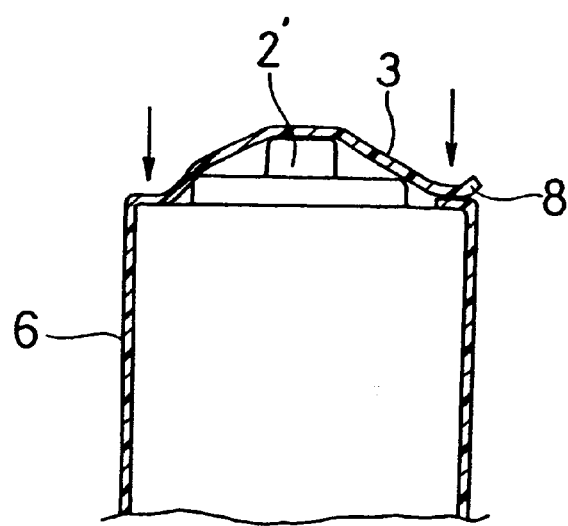
FIG. 6 is a partial schematic cross-sectional view of a battery having an identification seal formed integrally with a sheathing material in accordance with the present invention.

Next, FIG. 6 shows a partial schematic cross-sectional view of a battery having an identification seal formed integrally with a sheathing material in accordance with the present invention.

By pressing the portion indicated with the arrow shown in FIG. 6 while heating, it is possible to attach the old-or-new identification seal 3 on the positive electrode terminal 2, while covering the battery with the sheathing material 6.

Since the end portion 8 is not attached by adhesion, pulling this allows the identification seal 3 to be readily stripped. Also, since the heat sensitive adhesive layer is not provided on the positive electrode terminal surface 2', the identification seal 3 can be easily removed.

INDUSTRIAL APPLICABILITY

As described above, according to the present invention, it is possible to obtain a battery which is simple in terms of the attaching operation and is highly reliable in ensuring the virginity.

What is claimed is:

1. A battery comprising an old-or-new identification seal made of an insulating base material having a heat sensitive adhesive layer, said seal being attached on at least one of a positive electrode terminal surface and a negative electrode terminal surface via said adhesive layer.

2. The battery in accordance with claim 1, wherein said insulating base material is made of a heat-shrinkable resin film.

3. The battery in accordance with claim 1, wherein said old-or-new identification seal has an adhesive-free layer on a portion thereof in contact with said positive electrode terminal surface and/or said negative electrode terminal surface.

4. The battery in accordance with claim 1, wherein said battery is covered with a heat-shrinkable sheathing material, and said old-or-new identification seal is formed integrally with said sheathing material.

5. The battery in accordance with claim 1, wherein said seal is configured to be removably attached on at least one of the positive electrode terminal surface and the negative electrode terminal surface.

* * * * *